United States Patent
Cooper et al.

(10) Patent No.: US 9,436,251 B2
(45) Date of Patent: Sep. 6, 2016

(54) FAST PLATFORM HIBERNATION AND RESUMPTION OF COMPUTING SYSTEMS

(75) Inventors: Barnes Cooper, Tigard, OR (US); Faraz A. Siddiqi, Portland, OR (US)

(73) Assignee: Intel Corporeation, Santa Clara, CA (US)

( * ) Notice: Subject to any disclaimer, the term of this patent is extended or adjusted under 35 U.S.C. 154(b) by 345 days.

(21) Appl. No.: 13/996,480

(22) PCT Filed: Oct. 1, 2011

(86) PCT No.: PCT/US2011/054473
§ 371 (c)(1),
(2), (4) Date: Jun. 20, 2013

(87) PCT Pub. No.: WO2013/048523
PCT Pub. Date: Apr. 4, 2013

(65) Prior Publication Data
US 2013/0290760 A1    Oct. 31, 2013

(51) Int. Cl.
*G06F 1/00* (2006.01)
*G06F 1/32* (2006.01)
(Continued)

(52) U.S. Cl.
CPC .............. *G06F 1/32* (2013.01); *G06F 1/3203* (2013.01); *G06F 9/4418* (2013.01);
(Continued)

(58) Field of Classification Search
CPC ........... G06F 13/00; G06F 2212/2022; G06F 2212/205; G06F 2212/401; G06F 12/023; G06F 1/3275; G06F 21/81; G06F 3/0608; G06F 9/4418
See application file for complete search history.

(56) References Cited

U.S. PATENT DOCUMENTS 5,978,922 A * 11/1999 Arai et al. ................... 713/323
6,131,166 A  10/2000 Wong-Insley
(Continued)

FOREIGN PATENT DOCUMENTS

JP  10-207588  8/1998
JP  10-320302  12/1998
(Continued)

OTHER PUBLICATIONS

Notice of Allowance mailed Jan. 21, 2015, in U.S. Appl. No. 13/730,575, 9 pages.
(Continued)

*Primary Examiner* — Xuxing Chen
(74) *Attorney, Agent, or Firm* — Blakely, Sokoloff, Taylor & Zafman LLP

(57) ABSTRACT

Fast platform hibernation and resumption for computing systems. An embodiment of an apparatus includes a volatile system memory, a nonvolatile memory, and a processor to operate according to an operating system, the processor to transition the apparatus to a first reduced power state upon receipt of a request, the transition to the first reduced power state including the processor to store context information for the computer in the volatile system memory. The apparatus further includes logic to transition the apparatus to a second reduced power state, the logic to copy the context data from the volatile system memory to the nonvolatile memory for the transition to the second reduced power state, where copying of the context data includes the logic to scan the volatile system memory to locate non-active memory elements in the volatile system memory, eliminate the non-active memory elements from the volatile system memory to generate compressed context data, and store the compressed context data in the nonvolatile memory.

24 Claims, 8 Drawing Sheets

(51) Int. Cl.
| | | |
|---|---|---|
| *G06F 9/44* | (2006.01) | |
| *G06F 21/81* | (2013.01) | |
| *G06F 3/06* | (2006.01) | |
| *G06F 12/02* | (2006.01) | |
| *G06F 13/00* | (2006.01) | |

(52) U.S. Cl.
CPC .......... *G06F 1/3275* (2013.01); *G06F 3/0608* (2013.01); *G06F 12/023* (2013.01); *G06F 13/00* (2013.01); *G06F 21/81* (2013.01); *G06F 2212/205* (2013.01); *G06F 2212/2022* (2013.01); *G06F 2212/401* (2013.01); *Y02B 60/186* (2013.01)

(56) References Cited

U.S. PATENT DOCUMENTS

| | | | |
|---|---|---|---|
| 6,266,776 B1* | 7/2001 | Sakai | 713/300 |
| 6,901,298 B1 | 5/2005 | Govindaraj et al. | |
| 6,968,469 B1 | 11/2005 | Fleischmann et al. | |
| 7,100,037 B2 | 8/2006 | Cooper | |
| 7,152,169 B2 | 12/2006 | Cooper et al. | |
| 7,210,045 B2 | 4/2007 | Dunstan | |
| 7,293,183 B2 | 11/2007 | Lee et al. | |
| 7,310,725 B2 | 12/2007 | Zimmer et al. | |
| 7,484,109 B2 | 1/2009 | Feldman et al. | |
| 7,725,746 B2 | 5/2010 | Lee et al. | |
| 7,730,330 B1 | 6/2010 | Fleischmann et al. | |
| 7,971,071 B2 | 6/2011 | Walkoe et al. | |
| 7,971,081 B2 | 6/2011 | Cooper et al. | |
| 8,694,814 B1 | 4/2014 | Salomon et al. | |
| 2001/0046173 A1* | 11/2001 | Yoshikoshi | 365/230.06 |
| 2002/0073298 A1* | 6/2002 | Geiger | G06F 12/023 711/206 |
| 2003/0233591 A1 | 12/2003 | Chiteboun et al. | |
| 2004/0003223 A1 | 1/2004 | Fortin et al. | |
| 2004/0025045 A1 | 2/2004 | Chan | |
| 2004/0034765 A1 | 2/2004 | James | |
| 2005/0044433 A1 | 2/2005 | Dunstan | |
| 2005/0149646 A1 | 7/2005 | Kadatch et al. | |
| 2006/0053325 A1* | 3/2006 | Chary et al. | 713/320 |
| 2006/0200691 A1 | 9/2006 | Yomo et al. | |
| 2007/0136523 A1 | 6/2007 | Bonella et al. | |
| 2007/0288687 A1 | 12/2007 | Panabaker | |
| 2007/0291571 A1* | 12/2007 | Balasundaram | 365/227 |
| 2008/0082845 A1* | 4/2008 | Morisawa | 713/323 |
| 2009/0024843 A1 | 1/2009 | Choi | |
| 2009/0208002 A1 | 8/2009 | Koehane et al. | |
| 2009/0240954 A1 | 9/2009 | Figueroa et al. | |
| 2010/0037076 A1 | 2/2010 | Reece et al. | |
| 2010/0100747 A1 | 4/2010 | Boscher et al. | |
| 2010/0211731 A1 | 8/2010 | Mittendorff et al. | |
| 2011/0231595 A1 | 9/2011 | Wakrat et al. | |
| 2012/0143877 A1 | 6/2012 | Kumar et al. | |
| 2013/0067137 A1 | 3/2013 | Molloy | |
| 2013/0173942 A1 | 7/2013 | Forristal et al. | |
| 2013/0212317 A1 | 8/2013 | Traister et al. | |
| 2013/0290760 A1 | 10/2013 | Cooper et al. | |
| 2014/0164675 A1 | 6/2014 | Ehrlich et al. | |

FOREIGN PATENT DOCUMENTS

| | | |
|---|---|---|
| JP | 2004-227085 | 8/2004 |
| JP | 2006-079468 | 3/2006 |
| KR | 20050040498 | 5/2005 |
| TW | 538333 | 6/2003 |
| TW | 200943046 | 10/2009 |

OTHER PUBLICATIONS

Office Action mailed Feb. 4, 2015 (+ English translation), in Taiwan Patent Application No. 101133497, 13 pages.
Office Action from JP2010-540707 mailed Nov. 15, 2011, 6 pages.
Office Action from CN Patent Application No. 200880123248.X mailed Nov. 24, 2011, 17 pages.
International Search Report and Written Opinion mailed May 4, 2012, in International Application No. PCT/US2011/054473, 9 pages.
"Advanced Configuration and Power Interface Specification", Hewlett-Packard Corporation et al., Revision 3.0b, Oct. 10, 2006 cover page, p. ii, pp. 402-415, 16 pages.
First Office Action (+ English translation) in Taiwan Patent Application No. 097147665, 21 pages.
"Intel® NAND Flash Memory for Intel® Turbo Memory White Paper", Intel Corporation, 8 pages.
International Search Report and Written Opinion of the International Searching Authority in PCT/US2008/084710, 11 pages.
Office Action dated Aug. 2, 2012 (+ English translation), in Chinese Patent Application No. 200880123248.X., 6 pages.
Office Action from DE Patent Application No. 112008003520.2-53 mailed Feb. 3, 2012, 6 pages.
Office Action dated May 15, 2013 (+ English translation), in Taiwan Patent Application No. 097147665, 4 pages.
Office Action mailed Apr. 4, 2014, in U.S. Appl. No. 13/340,558, 11 pages.
Advisory Action mailed Oct. 31, 2014, in U.S. Appl. No. 13/340,558, 4 pages.
Office Action mailed Aug. 11, 2014, in U.S. Appl. No. 13/340,558, 14 pages.
Office Action mailed Oct. 8, 2014, in U.S. Appl. No. 13/730,575, 15 pages.

\* cited by examiner

270
*Filtered FFS DMA Table*

| Non-Zero Page | Non-Zero Page | Empty Entry | Non-Zero Page | Empty Entry | Empty Entry | Empty Entry | Non-Zero Page | Non-Zero Page | Empty Entry | Empty Entry | Non-Zero Page | Non-Zero Page | Non-Zero Page |

250
*Zero Page Filter*

```
1x1111xxx1111xx111
11111x1xx1111xxxxx
x11x1x1x1xx1xx1x1
x1xx11xx1111xxxxx
1xx1x1x1xx1x1xxx1x
xx1xxxxx11111xx1x1
1x1xx1xxx1xx111111
xxx111x
```

Zero pages are discarded 255

...0000000..

220
*Non-Filtered FFS DMA Table*

| Non-Zero Page | Non-Zero Page | Zero Page | Non-Zero Page | Zero Page | Zero Page | Zero Page | Non-Zero Page | Non-Zero Page | Zero Page | Zero Page | Non-Zero Page | Non-Zero Page | Non-Zero Page |

FIG. 2

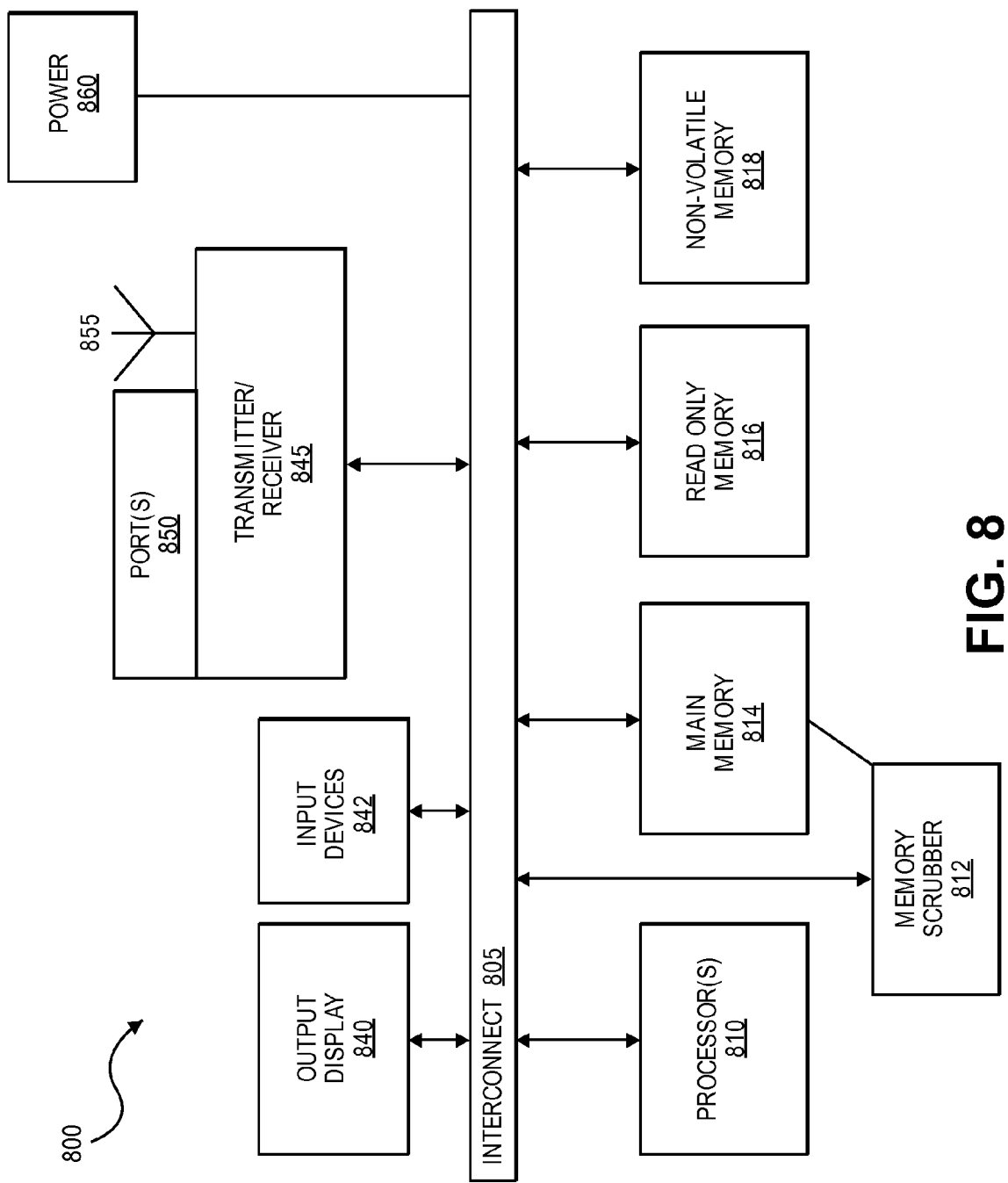

FAST PLATFORM HIBERNATION AND RESUMPTION OF COMPUTING SYSTEMS

CROSS-REFERENCE TO RELATED APPLICATION

This application is a national phase of PCT/US2011/054473 filed Oct. 1, 2011, which application is incorporated herein by reference in its entirety.

TECHNICAL FIELD

Embodiments of the invention generally relate to the field of computing systems and, more particularly, to fast hibernation and resumption of computing systems.

BACKGROUND

Computing system may be transferred between various power states. In general, each power state provides for the powering down of certain elements of the computing system during period of inactivity. Lower states generally provide further power savings, but also required additional time to return to operation.

For example, power states may include state referred to as S-states, including S3 and S4. S3, sometimes referred to as Standby, Sleep, or Suspend to RAM, is a sleep state in which the operating system (OS) of a computing system saves the context of the system into physical memory (dynamic random access memory (DRAM)) and puts the computing system into a suspend state. In this operation, open documents and programs (applications) (or a portion thereof) that were used at the time of entering into S3 are also saved in DRAM during the suspend state. Further, contents of some chipset registers may also be written to DRAM. The physical memory DRAM is may be referred to as main memory or system memory. During the S3 state, power is removed from the platform hardware, with the exception of the DRAM and a small amount of circuitry used to later wake the system. The S3 power state provides a relatively fast suspend and resume (wake) time due to its ability to save and restore OS context and previously used programs and documents from hi-speed DRAM memory.

S4, sometimes referred to as Hibernate, Safe Sleep, or Suspend to disk, provides that the OS context and open documents and programs (or a portion thereof) are saved on a hard disk drive (HDD) rather than in fast DRAM memory. This allows for higher power savings than the S3 state because the DRAM is not kept powered. However, there are higher latencies due to slow read and write access times of the HDD. Typical S4 hibernate and resume times are in the order of 10's of seconds.

Computer platform hibernation and resumption is described in, for example, U.S. Pat. No. 7,971,071, "System and Method for Fast Platform Hibernate and Resume".

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2 is an illustration of the transformation of data by an embodiment of an apparatus, system, or process for fast platform hibernation and resumption;

FIG. 8 illustrates an embodiment of a computing system that provides for fast platform hibernation and resumption.

DETAILED DESCRIPTION

Figure 1:
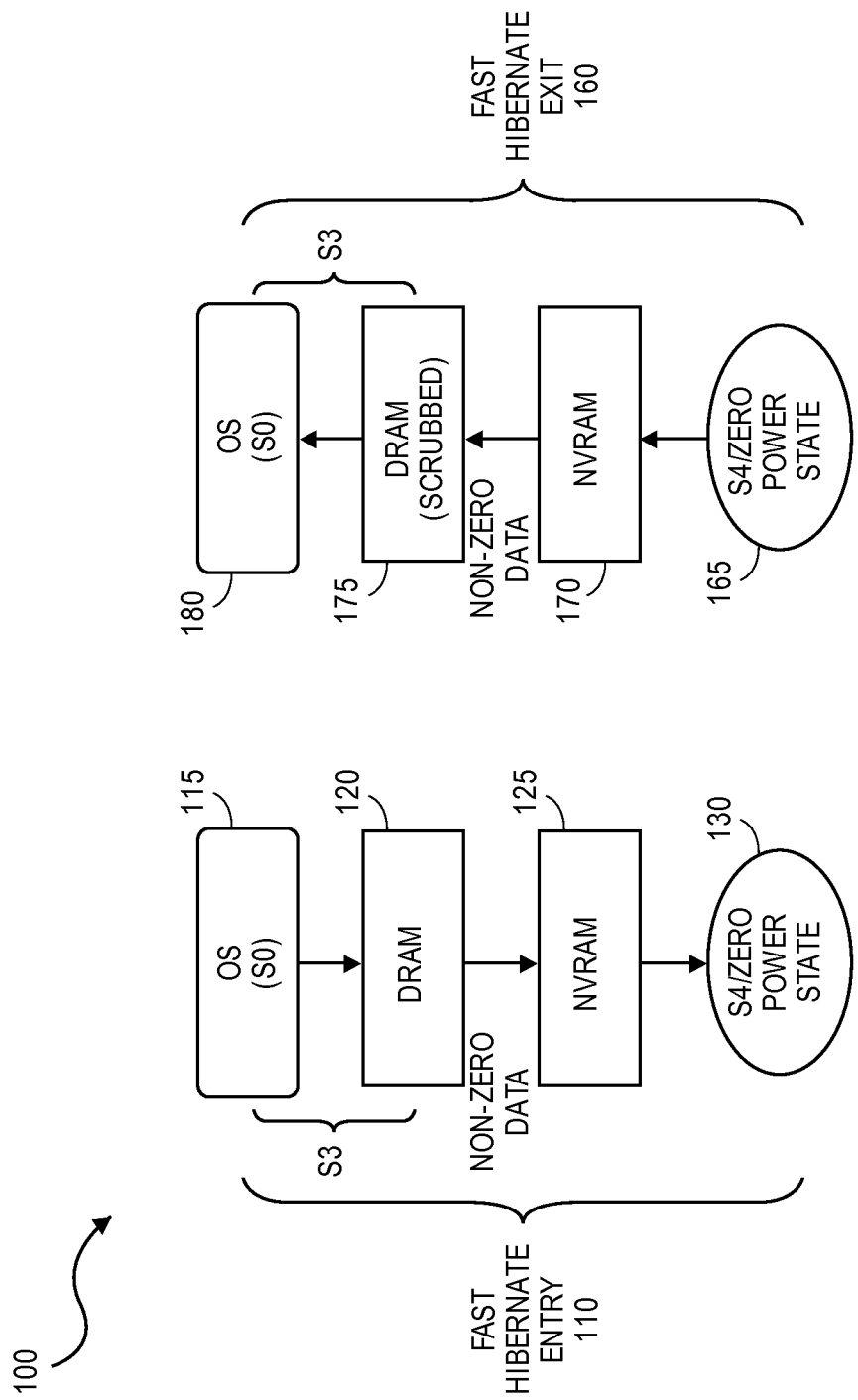
FIG. 1 illustrates embodiments of processes for a computer platform to enter into a fast hibernate state and to exit the fast hibernate state.

Embodiments of the invention are generally directed to fast platform hibernation and resumption for computing systems.

In some embodiments, an apparatus, system, or method (such as a computing apparatus, system, or method) provides an enhanced process for fast platform hibernation and resumption. In some embodiments, an apparatus, system, or process includes mechanism to improve the platform hibernation through efficient handling of context data, including elimination of zero page data in hibernation. In some embodiments, an apparatus, system, or process further improves platform resumption through zeroing of memory to return zero pages in the reloading of context data. In some embodiments, the zeroing of memory including use of a hardware element to provide improved initialization of zeros in memory.

In some embodiments, an apparatus, system or method may include: detecting and calculating OS active DRAM memory physical pages; building a filter (referred to as a zero page filter)/bitmap to identify non-active (zero) DRAM pages or other memory elements; initialization of DRAM to zeros via a hardware or software mechanism; efficient processing of direct memory access stream using the zero page filter/bitmap; and application of runtime OS mechanism to flush OS dirty DRAM pages.

Conventional computing systems face additional issues the amount of memory, and thus the amount of context data to be saved, increases. Such systems do not address the performance implication that results for large DRAM memory size. In some embodiments, an apparatus, system, or method provides a smart mechanism to trim the size of DRAM pages that needs to be saved to and restored from nonvolatile memory, thus providing significant improvement to the performance of hibernate/shutdown and resume processes.

In some embodiments, an apparatus, system, or method includes two parts: A first mechanism or process to transparently and efficiently store system memory data onto a persistent storage medium; and a second mechanism or process to efficiently recover the system memory data from the storage medium and replace it back into the system memory.

In some embodiments, an apparatus, system, or process provides for a fast platform hibernate and resume apparatus or process, including the copying of context information from volatile system memory to nonvolatile memory (which may be referred to as NVRAM, or nonvolatile random-access memory) as a part of the transition to the lower power states. In some embodiments, the apparatus or process includes the copying of the stored context information back to volatile system memory upon a transition back to an operational state from the hibernate state. In some embodiments, the apparatus, system, or process provides for determining the location of each portion of a memory that is unused and contains zero information. In some embodiments, the device or system provides for elimination of all zero elements of the memory in the copying of context information.

In some embodiments, an apparatus, system, or process includes a memory scrubber, wherein the memory scrubber operates to clear or zero elements of a DRAM memory. In some embodiments, the memory scrubber allows for zeroing elements of a memory more quickly than software can provide a zeroing function. In some embodiments, the memory scrubber is utilized in the resumption of operation of the system or system from a hibernate state to zero out all elements of initialized volatile memory prior to restoring the platform context from nonvolatile memory. In some embodiments, an apparatus, system, or method allows for improved operation in fast platform hibernate and resume by reducing the amount of data that is required to be stored and recovered, by the elimination of zero data elements and by the zeroing of the volatile memory on resume to allow for quicker reloading of zero data elements into the volatile memory.

In some embodiments, a device or system further includes a section of memory for quick access in a hibernate state. In some embodiments, a section of memory may include, for example, a calendar or data that may require quick access when the system or device is in a low power state.

In some embodiments, a storage process is initiated by power management logic or BIOS. In some embodiments, the storage process may be independently initiated or be initiated at the request of the operating system. In some embodiments, a hibernation process for a platform includes:

(a) The operating system initiates a transition to a first reduced power state, such as a Sleep (S3) transition, by saving the current state of the volatile system DRAM.

(b) In some embodiments, as a part of a fast hibernation system, an operating system agent, such as a fast hibernation service or a driver, may optionally flush parts of OS memory to disk, thus making the OS DRAM active memory footprint as small as possible.

(c) A hardware processor, such as the central processing unit (CPU) or an embedded processor (EP), or system software, such as the binary input-output system (BIOS) or firmware (FW), copies OS DRAM memory contents to nonvolatile storage location, either directly or via indirect means such as device direct memory access (DMA).

(d) In some embodiments, upon receiving an OS low power entry request (such as Standby-S3/S0ix), a user level application or a driver operates to flush dirty and partial active memory pages to disk while converting freed up DRAM memory pages to zeros. In some embodiments, this operation provides for decreasing the overall size of DRAM active (non-zero) memory pages, while increasing the size of zero page pool.

(e) The operating system may indicate an intention to transition to a second reduced power state, such as a hibernate state, where a computing system in the second reduced power state consumes less power than the computing system in the first reduce power state. For example, the operating system may operate to set certain bits (the SLP_TYP and SLP_EN bits) in the chipset to indicate to the chipset hardware that the wants to transition to hibernate state.

(f) In some embodiments, the operating system may use a mechanism provided by system hardware to enter into the first reduced power state, such as Standby S3/S0ix state.

(g) Upon receiving the sleep event, system hardware may pass control to power management logic, BIOS, or firmware, which then scans the system memory for active and inactive memory, and builds a zero page filter (such as a bitmap) of non-active (zero) pages or other memory elements.

(h) In some embodiments, the power management logic, BIOS, or firmware then uses the zero page filter to discard unused DRAM memory pages from the DMA stream, while copying the active (non-zero) pages to nonvolatile memory.

(i) In some embodiments, the zero page filter is then stored in the nonvolatile memory for use in resumption of operation.

(j) In some embodiments, the power management logic, BIOS, or firmware puts the system into an S4/S5 sleep state. In some embodiments, the power management logic or BIOS can optionally put the system in a complete mechanical off (G3) state.

Upon receiving a wake event, such a power button signal, a real-time clock (RTC) alarm, or other wake event, the power management logic or BIOS initiates a restore process. In some embodiments, a restore process for a platform includes:

(a) Upon the occurrence of a wake event, power management logic, BIOS, or firmware powers on prior to other elements of the system, and operates to initializes DRAM, and starts scrubbing the entire DRAM with zeros. Upon the entire DRAM memory having been scrubbed with zeros, the power management logic, BIOS, or firmware commences to restore the active (non-zero) DRAM pages from the NVRAM using previously stored zero page filter.

(b) The power management logic, BIOS, or firmware proceeds to perform a system restore (such as an S3 resume) according to normal procedure.

In some embodiments, an apparatus, system, or method provides for fast platform hibernation in which a system context is written into a nonvolatile memory (a smaller nonvolatile memory or NVRAM), which has a smaller capacity than another nonvolatile memory (the larger nonvolatile memory or hard disc drive) that is used to store at least one operating system, programs, and data. In a resume from fast hibernate, the system context is read from the smaller nonvolatile memory and used to restore operation of a computer system. In some embodiments, the system context is transferred entirely from DRAM system memory to the smaller nonvolatile memory and on resume transferred entirely from the smaller nonvolatile memory to the DRAM system memory. In other embodiments, the system context can come partly from other memory such as chipset registers and be written back directly to those registers rather than go indirectly through the DRAM.

In some embodiments, in the fast hibernate process, the transfer from the DRAM system memory to the smaller nonvolatile memory occurs even after processor cores and other system components such as a hard drive and display screen are powered down. This allows the user of the computer to a have the perception that the computer system is shut down quickly, even though the transfer of the system context has not been completed. Accordingly, embodiments improve the user perception of the system responsiveness. In some embodiments, the system responsiveness is further improved by the reduction in memory storage through the elimination of zero pages from storage, such that the memory shuts down more quickly.

In some embodiments, a fast hibernate process utilizing an operating system that is designed for S3 (a first reduced power state) and S4 (a second reduced power state) states, but not specifically designed for the fast hibernate process. This may occur by having the BIOS and/or another mechanism respond to a suspend to RAM (S3) command by putting the processor into a system management mode (SMM), and controlling the transfer from the DRAM system memory to the smaller nonvolatile memory and then changing a sleep type to hibernate state. In these embodiments, the process may be transparent to the operating system.

FIG. 1 illustrates embodiments of processes for a computer platform to enter into a fast hibernate state and to exit the fast hibernate state. In this illustration, the fast hibernate state entry 110 commences with an operating system at an operational (S0) 115 state transitioning to a sleep (S3) state, including the storing of context data to volatile DRAM memory 120. In some embodiments, the fast hibernate process includes identification of zero data pages. The fast hibernate process further includes copying non-zero data pages of the context information from the DRAM, with the non-zero data and a zero page filter stored in NVRAM 125. The storage to nonvolatile memory, allows for transition of the platform to a hibernate (S4) state or, optionally, a zero power state 130.

In some embodiments, the fast hibernate exit process 160 begins with S4 or zero power state 165. In some embodiments, upon waking of logic such as power management logic or BIOS, the DRAM 175 is scrubbed with zero values, and non-zero pages are restored from the NVRAM 170 to the DRAM 175 using the stored zero page filter. The loading of the context into the DRAM 175 then puts the data in the proper location for restoring the context using the sleep state (S3) processes, thereby returning the operating system 180 to the operational (S0) state.

FIG. 2 is an illustration of the transformation of data by an embodiment of an apparatus, system, or process for fast platform hibernation and resumption. In some embodiments, in a fast hibernate process, a non-filtered FFS (flash file system) DMA table 220, representing a system context stored to DRAM for transition to a sleep state, may be scanned for zero pages. The scanning results in a zero page filter 250 representing the locations of the active/non-zero pages and the non-active/zero pages. In some embodiments, the zero pages are then discarded 255. In some embodiments, the fast hibernate process then results in a filtered FFS DMA table 270, where the filtered table includes non-zero pages and empty entries.

Figure 3:
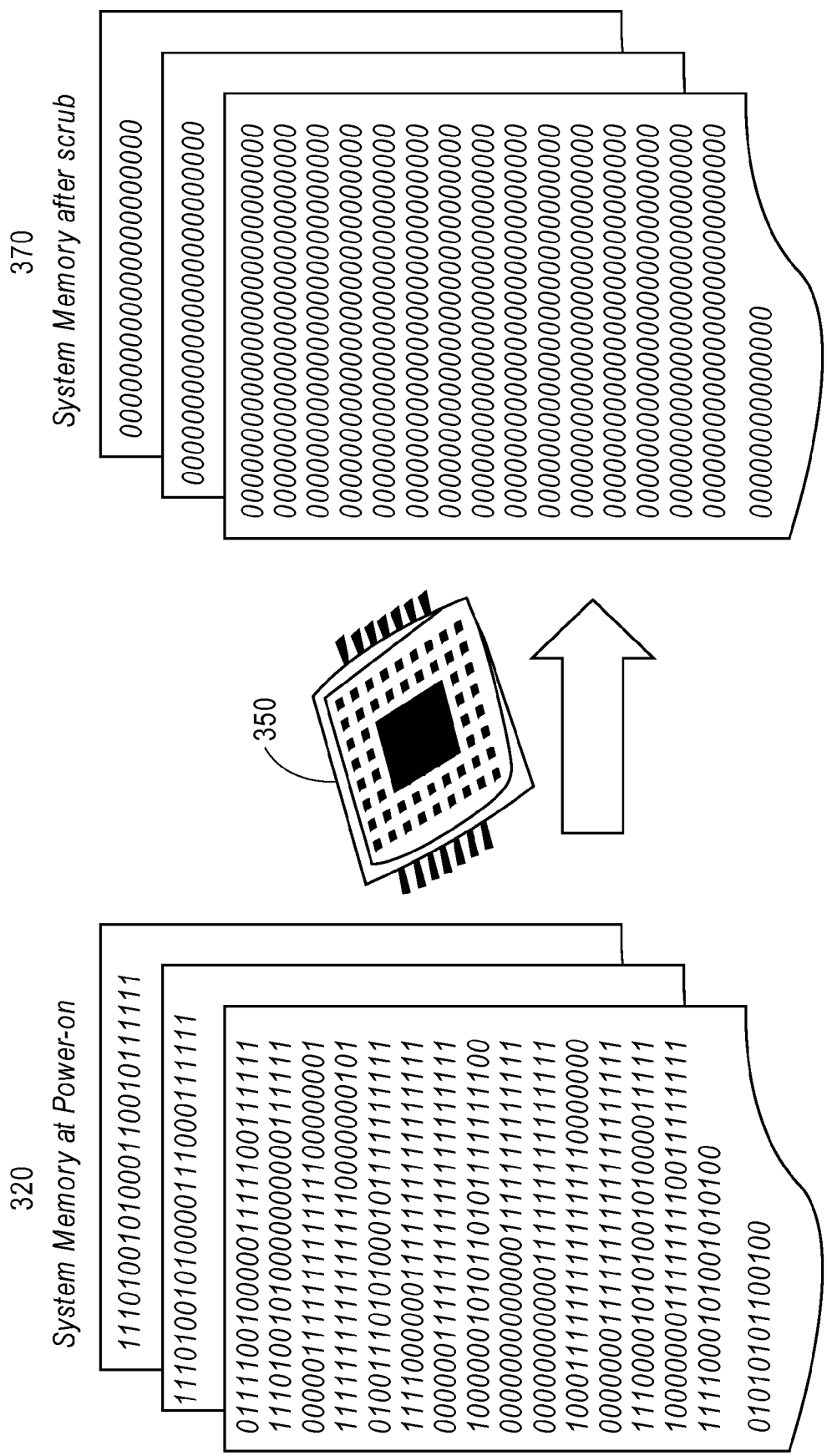
FIG. 3 is an illustration of an embodiment of a memory scrubbing operation in a fast platform hibernation and resumption apparatus, system, or method.

FIG. 3 is an illustration of an embodiment of a memory scrubbing operation in a fast platform hibernation and resumption apparatus, system, or method. In some embodiments, an exit from fast hibernation includes initiation of the DRAM prior to re-loading the data from the nonvolatile memory. However, the DRAM memory 320 will contain random one and zero values as the states of memory elements when returned to power are generally instable. The restoration of data from the nonvolatile memory will only restore the values of non-zero elements, and thus the zero elements will contain random data if no action is taken In some embodiments, prior to the restoration of data to the DRAM from nonvolatile memory, the DRAM is scrubbed by a hardware scrubbing element 350, where the hardware element 350 is capable of storing zeros in each bit of the computer DRAM significantly more quickly than this process may be accomplished using software commands. In some embodiments, the result is scrubbed memory 370 that contains zero elements in every bit. In some embodiments, the scrubbed memory 370 then may be utilized to hold the restored system context from nonvolatile memory, where the non-zero pages may be entered according to a zero filter page, such as zero filter page 250 in FIG. 2, thereby returning the DRAM to a state for transition by the operating system back to an operational (S0) state.

Figure 4:
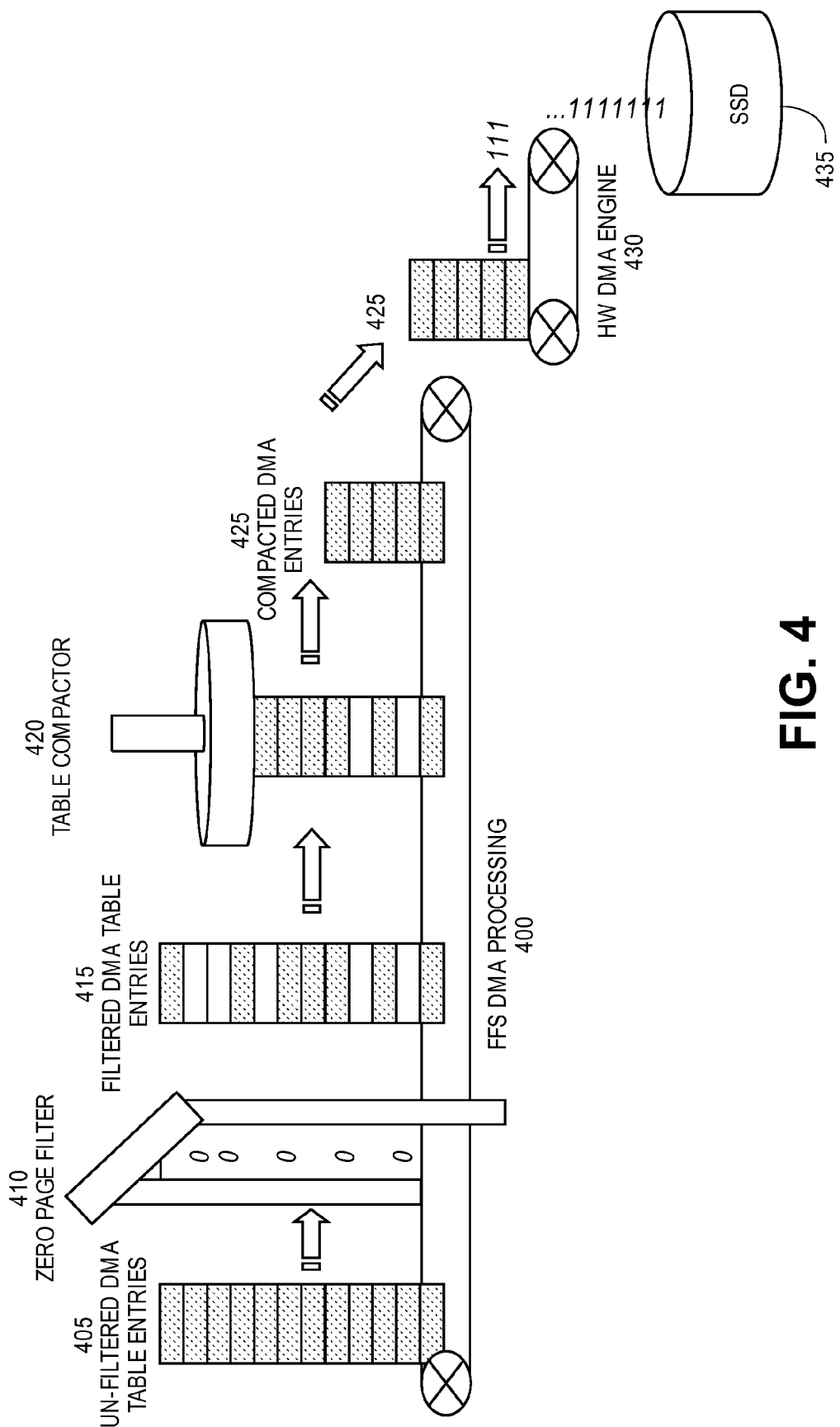
FIG. 4 is an illustration of an embodiment of memory processing in a fast platform hibernate apparatus, system, or method.

FIG. 4 is an illustration of an embodiment of memory processing in a fast platform hibernate apparatus, system, or method. In some embodiments, in FFS DMA processing 400, unfiltered DMA table entries 405 are processed by a zero page filter 410 to identify zero pages in the table entries. In some embodiments, the processing results in a table of filtered DMA table entries 415 (such as table entries 270 illustrated in FIG. 2) containing non-zero pages and empty entries.

In some embodiments, the filtered table entries are compacted, shown by the process of a table compactor 420, resulting in the compacted DMA entries 425, which generally are significantly reduced from the original table entries. In some embodiments, the compacted DMA entries 425 are processed by a hardware DMA engine 430 for storage in nonvolatile memory, shown as storage in a solid state drive (SSD) 435.

Figure 5:
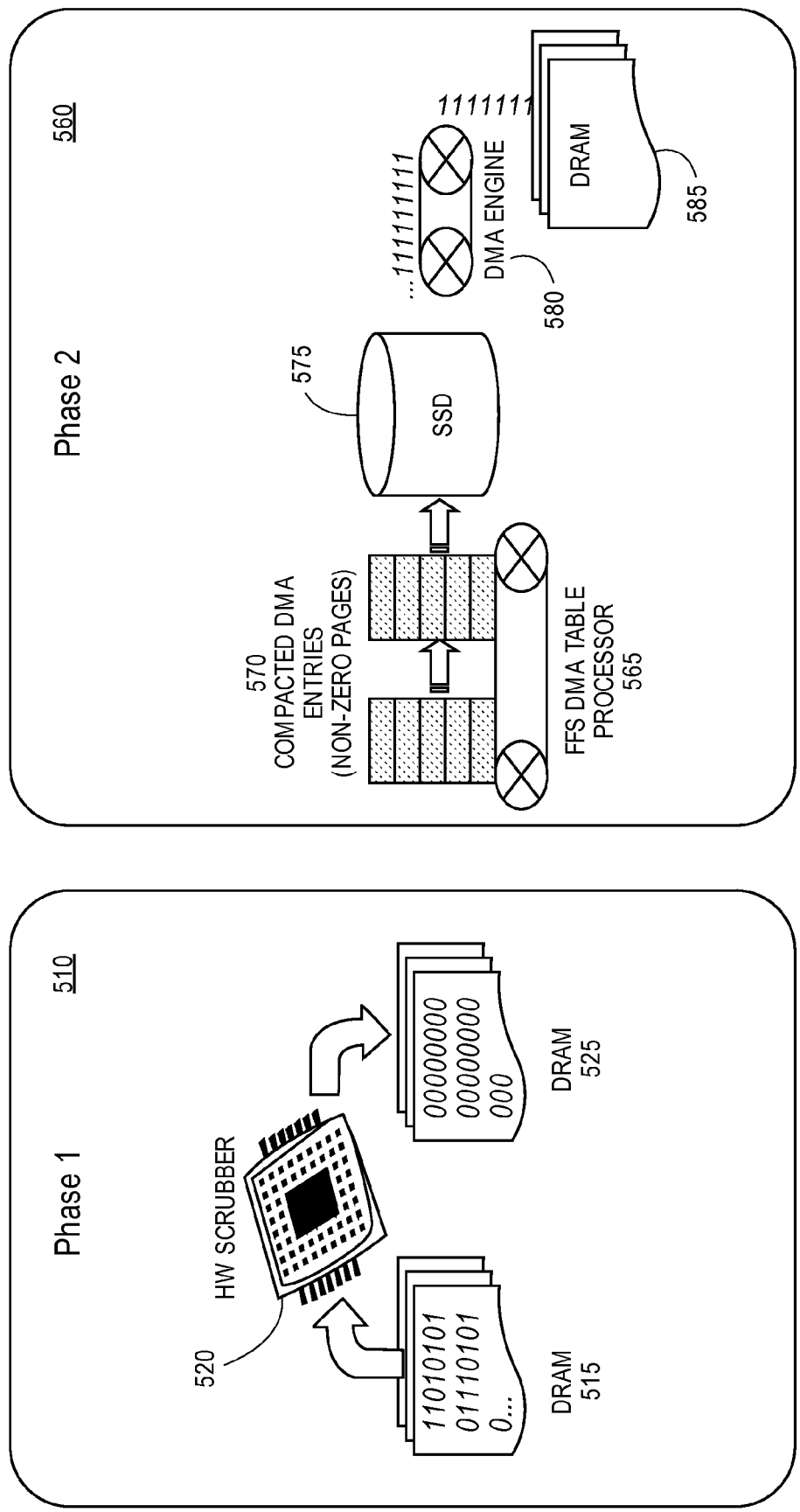
FIG. 5 is an illustration of an embodiment of resumption of a computing system from a fast platform hibernation process.

FIG. 5 is an illustration of an embodiment of resumption of a computing system from a fast platform hibernation process. In some embodiments, an apparatus, system, or method provides for resumption from fast hibernation, where the resumption may be described as a two phase process. In some embodiments, a first phase 510 provides for the preparation of the DRAM for loading of context data.

In some embodiments, upon the computing platform receiving a power on event, the power management logic or BIOS is powered on operates to initialize the DRAM memory 515. However, upon initialization, the bits of DRAM memory will generally be random. In order to provide for the loading of context data, the memory is scrubbed to provide a zero in every bit of the memory. In some embodiments, the DRAM 515 is scrubbed by a hardware scrubber 520, where the hardware scrubber can quickly zero out the DRAM to produce scrubbed memory 525, containing zero in data bits of the memory.

In some embodiments, a second phase 560 involves obtaining the context data stored in SSD memory 575, where compacted DMA entries 570 (the non-zero pages) were stored by FFS DMA table processor 565 together with the zero page filter (such as element 250 illustrated in FIG. 2) in the fast hibernation process. In some embodiments, the DMA engine 580 operates to obtain the data from the SSD, which further involve obtaining the zero page filter from the SSD. In some embodiments, the DMA engine 580 operates to store the compacted data in the scrubbed DRAM 585 according to the zero page filter, thereby resulting in putting the DRAM in a state for transition to an operational power state by the operating system.

Figure 6:
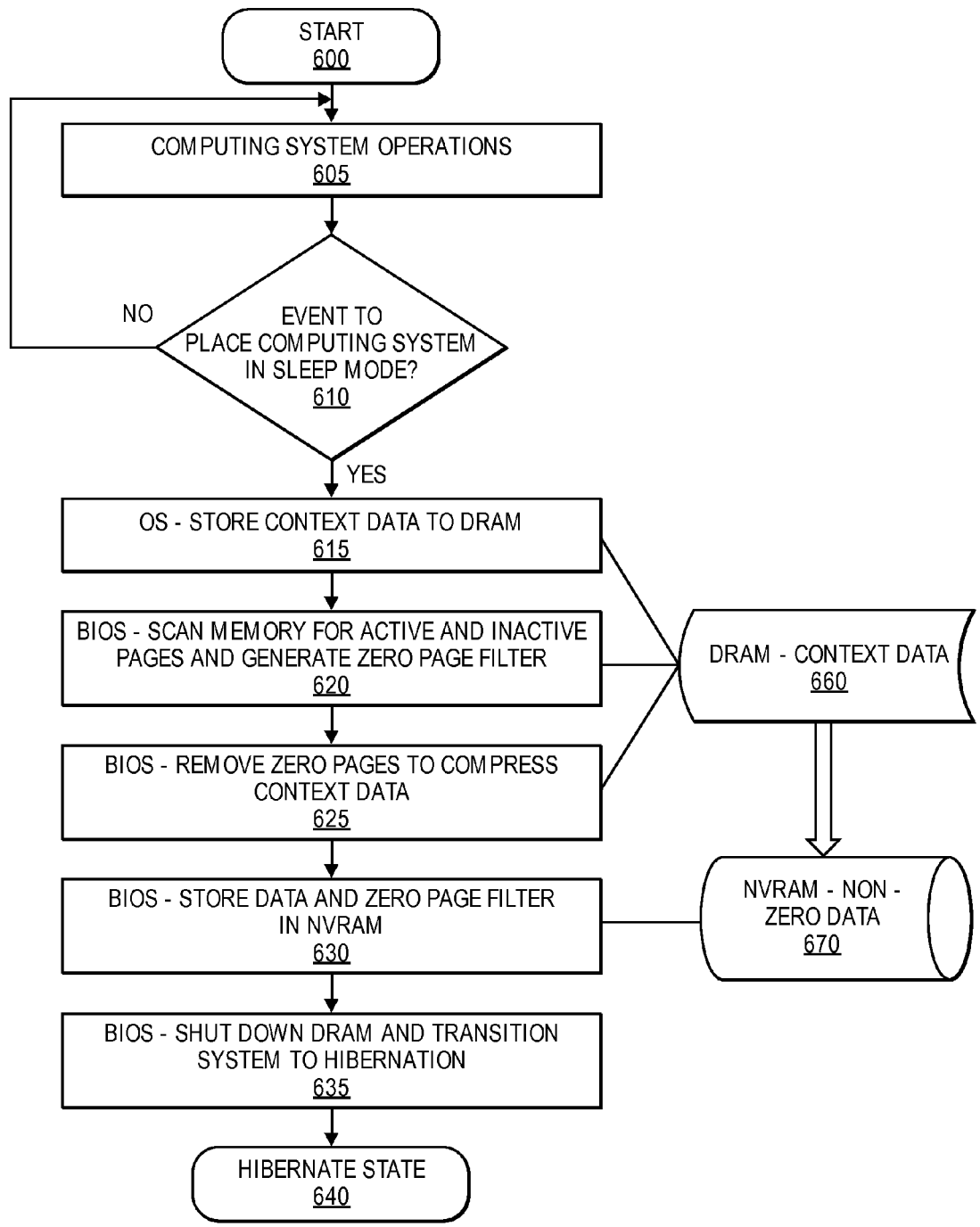
FIG. 6 is a flowchart to illustrate an embodiment of a process for fast platform hibernation of a computing system.

FIG. 6 is a flowchart to illustrate an embodiment of a process for fast platform hibernation of a computing system. In this illustration, a computing system may be started 600, thus placing the computing system in an operational (S0) power state. The computer system may continue with various computing system operation 605. Upon detecting an event calling for the computing system to be placed in a first reduced power state referred to here as a sleep state (which may be an S3 state, or other similar state) 610, the operating system take such actions need to enter into the sleep state, including storing current context data 616 to DRAM system memory 660.

In some embodiments, the control is passed to logic such as BIOS, power management logic, or firmware (with the BIOS case illustrated in FIG. 6). In some embodiments, the BIOS operates to scan the DRAM system memory for active and inactive pages, and to generate a zero page filter of the non-active pages 620. In some embodiments, the BIOS uses the zero page filter to eliminate inactive DRAM memory pages and thus compress the context data 625.

In some embodiments, the BIOS operates to store the compressed context data and the zero page filter 630 in nonvolatile memory (NVRAM) 670. In some embodiments, the storage in NVRAM may include certain data that may be accessible quickly upon initiation of the computing system, such as, for example, calendar or schedule data. In some embodiments, the BIOS then shuts down power to the DRAM, and proceeds to transition the system to a second reduced power state referred to here as a hibernate state (which may be an S4 state, or other similar state) 635, leaving the computing system in the hibernate state 640.

Figure 7:
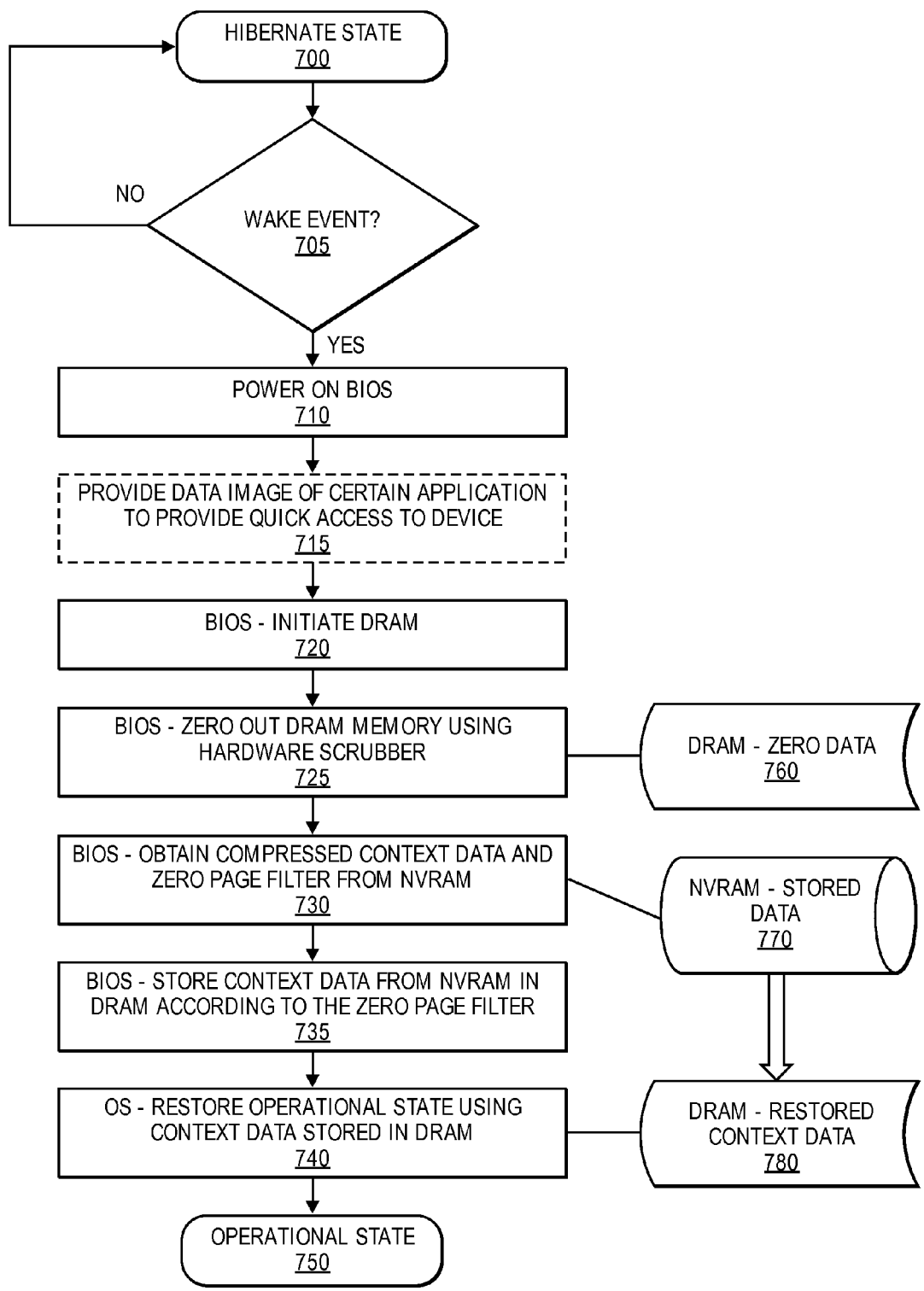
FIG. 7 is a flowchart to illustrate an embodiment of a process for fast platform resumption of computing system placed in a hibernate state.

FIG. 7 is a flowchart to illustrate an embodiment of a process for fast platform resumption of computing system placed in a hibernate state. In this illustration, a computing system may initially be in a second reduced power state (a hibernate state) 700. Upon detection of some wake event 705 (such as a power button signal, a real-time clock alarm, or other wake event), logic such as the power management logic, BIOS, or firmware (wherein the example of BIOS is provided in FIG. 7) powers on prior to other elements of the system 710. In some embodiments, the system may optionally provide for access to a data image for a certain application 715 to allow a user with quick access to this data.

In some embodiments, the BIOS operates to initiate the DRAM (volatile) system memory of the system 720, which generally will result in largely random data contained in the DRAM. In some embodiments, the BIOS operates to scrub or zero out the DRAM memory 760, where the operation utilizes a hardware scrubber that provides for fast zeroing of the memory 725.

In some embodiments, the BIOS obtains the stored compressed context data and zero page filter 730 from the NVRAM 770. The BIOS then proceeds to the context data from the NVRAM 770 into the DRAM system memory 780 according to the zero page filter 735, thereby recreating the data prior to elimination of zero page data in the hibernation process, and placing the data in a form for a first reduced power state (sleep state).

In some embodiments, the operating system may then proceed to restore the operational state using the recreated context data that is stored in the DRAM system memory 740, thereby resulting in transitioning the computing system from the sleep state into an operational state 750.

FIG. 8 illustrates an embodiment of a computing system that provides for fast platform hibernation and resumption. In this illustration, certain standard and well-known components that are not germane to the present description are not shown. Under some embodiments, the computing system 800 comprises an interconnect or crossbar 805 or other communication means for transmission of data. The computing system 800 may include a processing means such as one or more processors 810 coupled with the interconnect 805 for processing information. The processors 810 may comprise one or more physical processors and one or more logical processors. The interconnect 805 is illustrated as a single interconnect for simplicity, but may represent multiple different interconnects or buses and the component connections to such interconnects may vary. The interconnect 805 shown in FIG. 8 is an abstraction that represents any one or more separate physical buses, point-to-point connections, or both connected by appropriate bridges, adapters, or controllers.

In some embodiments, the computing system 800 includes a hardware memory scrubber 812, which may be utilized for the scrubbing of memory to replace data with zeros after the initiation of such memory in a resumption of operation after the system was placed in a hibernate state. In some embodiments, the computing system 800 further comprises a random access memory (RAM) or other dynamic storage device or element as a main memory 814 for storing information and instructions to be executed by the processors 810. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, the memory scrubber 812 may access the main memory 814, thus allowing the main memory 814 to be scrubbed prior to the transfer of data into the main memory upon the resumption of operations of the computing system 800. In some embodiments, memory of the system may include certain registers or other special purpose memory. The computing system 800 also may comprise a read only memory (ROM) 816 or other static storage device for storing static information and instructions for the processors 810. The computing system 800 may include one or more nonvolatile memory elements 818 for the storage of certain elements. In some embodiments, the nonvolatile memory elements 818 include nonvolatile memory for the storage of context data in a fast hibernation process.

The computing system 800 may also be coupled via the interconnect 805 to an output display 840. In some embodiments, the display 840 may include a liquid crystal display (LCD) or any other display technology, for displaying information or content to a user. In some environments, the display 840 may include a touch-screen that is also utilized as at least a part of an input device. In some environments, the display 840 may be or may include an audio device, such as a speaker for providing audio information. The computer system 800 may further include one or more input devices 842, such as a keyboard, mouse or other pointing device, a microphone for audio commands, and other input devices.

One or more transmitters or receivers 845 may also be coupled to the interconnect 805. In some embodiments, the computing system 800 may include one or more ports 850 for the reception or transmission of data. The computing system 800 may further include one or more antennas 855 for the reception of data via radio signals.

The computing system 800 may also comprise a power device or system 860, which may comprise a power supply, a battery, a solar cell, a fuel cell, or other system or device for providing or generating power. The power provided by the power device or system 860 may be distributed as required to elements of the computing system 800. In some embodiments, the power system 860 may include or may work with a power management logic, where such power management logic may provide for functions or processes connected with a fast platform hibernate and resumption.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   a volatile system memory;
   a nonvolatile memory;
   a processor to operate according to an operating system, the processor to transition the apparatus from an operational power state to a first reduced power state upon receipt of a request, the transition to the first reduced power state including the processor to store context data for the apparatus in the volatile system memory; and
   power management logic to transition the apparatus from the first reduced power state to a second reduced power state, the power management logic to copy the context data from the volatile system memory to the nonvolatile memory for the transition to the second reduced power state, wherein the copying of the context data includes the power management logic to:
      scan the volatile system memory to locate non-active memory elements in the volatile system memory,
      build a zero page filter of the non-active memory elements in the volatile system memory,
      eliminate the non-active memory elements from the volatile system memory based on the zero page filter to generate compressed context data,
      store the compressed context data and the zero page filter in the nonvolatile memory, and
      place the apparatus in the second reduced power state upon completion of storing the compressed context data and the zero page filter.

2. The apparatus of claim 1, wherein the power management logic is further to restore the context data from the nonvolatile memory to the volatile system memory upon a wake event for the apparatus occurring while the apparatus is in the second reduced power state.

3. The apparatus of claim 2, further comprising a hardware scrubbing element, wherein the hardware scrubbing element is to store zeros in data elements of the volatile system memory prior to the power management logic restoring the context data from the nonvolatile memory to the volatile system memory.

4. The apparatus of claim 2, wherein the power management logic to restore the context data includes the power management logic to obtain the zero page filter from the nonvolatile memory and to restore the context data from the nonvolatile memory to the volatile system memory according to the zero page filter.

5. The apparatus of claim 2, wherein the power management logic is to store zeros in data elements of the volatile system memory prior to restoring the context data from the nonvolatile memory to the volatile system memory.

6. The apparatus of claim 1, wherein the first reduced power state is a sleep state and the second reduced power state is a hibernate state, the apparatus to consume less power in the second reduced power state than the first reduced power state.

7. The apparatus of claim 6, wherein the power management logic to transition the apparatus from the first reduced power state to the second reduced power state includes the power management logic to store data for a certain application in a location in the nonvolatile memory, and wherein the power management logic is further make the data for the application available prior to restoring the context data from the nonvolatile memory to the volatile system memory.

8. The apparatus of claim 1, wherein the copying of the context data from the volatile system memory to the nonvolatile memory occurs after the processor is powered down.

9. A method comprising:
transitioning a computing system from an operational state to a first reduced power state upon receipt of a request, the first reduced power state including the storage of context information for the computing system in a volatile system memory; and
transitioning by a power management logic the computing system from the first reduced power state to a second reduced power state, including the power management logic copying the context data from the volatile system memory to a nonvolatile memory in the transition to the second reduced power state, wherein the copying of the context data includes the power management logic:
scanning the volatile system memory to locate non-active memory elements in the volatile system memory,
generating a zero page filter to indicate locations of the non-active memory elements in the volatile system memory,
eliminating the non-active memory elements from the volatile system memory based on the zero page filter to generate compressed context data,
storing the compressed context data and the zero page filter in the nonvolatile memory, and
placing the apparatus in the second reduced power state upon completion of storing the compressed context data and the zero page filter.

10. The method of claim 9, further comprising:
detecting a wake event for the computing system while the computing system is in the second reduced power state; and
restoring by the power management logic the context data from the nonvolatile memory to the volatile system memory.

11. The method of claim 10, further comprising the power management logic storing zeros in data elements of the volatile system memory prior to restoring the context data from the nonvolatile memory to the volatile system memory.

12. The method of claim 10, further comprising storing zeros in data elements of the volatile system memory prior to restoring the context data from the nonvolatile memory to the volatile system memory utilizing a hardware scrubbing element to scrub the volatile system memory.

13. The method of claim 10, wherein the power management logic restoring the context data from the nonvolatile memory to the volatile system memory includes the power management logic:
obtaining the zero page filter from the nonvolatile memory; and
restoring the context data to the volatile system memory according to the zero page filter.

14. The method of claim 9, wherein transitioning to the second reduced power state includes storing data for a certain application in a location in the nonvolatile memory, and further comprising making the data for the application available prior to restoring the context data from the nonvolatile memory to the volatile system memory.

15. The method of claim 9, wherein the copying of the context data from the volatile system memory to the nonvolatile memory occurs after a processor of the computer system is powered down.

16. A system comprising:
a DRAM (dynamic random access memory) element;
a nonvolatile memory element;
a processor to operate according to an operating system, the processor to transition the system from an operational power state to a first reduced power state upon receipt of a request, the first reduced power state including the storage of context information for the system in the volatile system memory;
power management logic to transition the system between the first reduced power state and a second reduced power state, the power management logic to copy the context data from the DRAM element to the nonvolatile memory element in a transition from the first reduced power state to the second reduced power state and to restore the context information from nonvolatile memory element to the DRAM element in a transition from the second reduced power state to the first reduced power state; and
a hardware memory scrubber to store zeros in elements of the DRAM element prior to the restoration of the context information from nonvolatile memory element to the DRAM element;
wherein the power management logic to copy the context data from the DRAM element to the nonvolatile memory element includes the power management logic to:
scan the volatile system memory to locate non-active memory elements in the volatile memory and generate a zero page filter of the non-active memory elements;
eliminate the non-active memory elements from the volatile system memory based on the zero page filter to generate compressed context data;
store the compressed context data and the zero page filter in the nonvolatile memory; and
place the system in the second reduced power state upon completion of storing the compressed context data and the zero page filter.

17. The system of claim 16, wherein the power management logic to restore the context data includes the logic to obtain the zero page filter from the nonvolatile memory and to restore the context data from the nonvolatile memory to the volatile system memory according to the zero page filter.

18. The system of claim 16, wherein the copying of the context data from the volatile system memory to the nonvolatile memory occurs after the processor is powered down.

19. A non-transitory computer-readable medium having stored thereon data representing sequences of instructions that, when executed by a processor, cause the processor to perform operations comprising:
transitioning a computing system from an operational state to a first reduced power state upon receipt of a request, the first reduced power state including the storage of context information for the computing system in a volatile system memory; and transitioning by a power management logic the computing system from the first reduced power state to a second reduced power state, including the power management logic copying the context data from the volatile system memory to a nonvolatile memory in the transition to the second reduced power state, wherein the copying of the context data includes the power management logic:

scanning the volatile system memory to locate non-active memory elements in the volatile system memory, generating a zero page filter to indicate locations of the non-active memory elements in the volatile system memory, eliminating the non-active memory elements from the volatile system memory based on the zero page filter to generate compressed context data, storing the compressed context data and the zero page filter in the nonvolatile memory, and placing the apparatus in the second reduced power state upon completion of storing the compressed context data and the zero page filter.

20. The medium of claim 19, further comprising instructions that, when executed by the processor, cause the processor to perform operations comprising:

detecting a wake event for the computing system while the computing system is in the second reduced power state; and restoring by the power management logic the context data from the nonvolatile memory to the volatile system memory.

21. The medium of claim 20, further comprising instructions that, when executed by the processor, cause the processor to perform operations comprising:

storing zeros, by the power management logic, in data elements of the volatile system memory prior to restoring the context data from the nonvolatile memory to the volatile system memory.

22. The medium of claim 20, further comprising instructions that, when executed by the processor, cause the processor to perform operations comprising:

storing zeros in data elements of the volatile system memory prior to restoring the context data from the nonvolatile memory to the volatile system memory by directing a hardware scrubbing element to scrub the volatile system memory.

23. The medium of claim 20, wherein restoring the context data includes the power management logic:

obtaining the zero page filter from the nonvolatile memory; and restoring the context data to the volatile system memory according to the zero page filter.

24. The medium of claim 19, further comprising instructions that, when executed by the processor, cause the processor to perform operations comprising:

storing data for a certain application in a location in the nonvolatile memory as a part of transitioning the computing system to the second reduced power state; and making the data for the application available prior to restoring the context data from the nonvolatile memory to the volatile system memory.

* * * * *